(12) United States Patent
Knutson et al.

(10) Patent No.: US 12,718,396 B2
(45) Date of Patent: Aug. 25, 2026

(54) AVIATION DOCUMENT TARGET AREA EXTRACTION SYSTEM AND METHOD

(71) Applicant: The Boeing Company, Arlington, VA (US)

(72) Inventors: Claire Carol Knutson, Chetek, WI (US); Yazan Firas Abughazaleh, Austin, TX (US); Mark E. Jeffcoat, Austin, TX (US)

(73) Assignee: The Boeing Company, Arlington, VA (US)

( * ) Notice: Subject to any disclaimer, the term of this patent is extended or adjusted under 35 U.S.C. 154(b) by 252 days.

(21) Appl. No.: 18/586,208

(22) Filed: Feb. 23, 2024

(65) Prior Publication Data

US 2025/0272869 A1 Aug. 28, 2025

(51) Int. Cl.

| | |
|---|---|
| ***G06N 3/08*** | (2023.01) |
| ***G06F 3/04817*** | (2022.01) |
| ***G06N 3/04*** | (2023.01) |
| ***G06T 7/11*** | (2017.01) |
| ***G06T 7/13*** | (2017.01) |
| ***G06T 7/60*** | (2017.01) |
| ***G06T 7/70*** | (2017.01) |
| ***G06V 10/25*** | (2022.01) |
| ***G06V 10/26*** | (2022.01) |
| ***G06V 10/44*** | (2022.01) |
| ***G06V 10/82*** | (2022.01) |
| ***G06V 30/414*** | (2022.01) |

(52) U.S. Cl.

CPC ............ *G06T 7/70* (2017.01); *G06F 3/04817* (2013.01); *G06T 7/11* (2017.01); *G06T 7/13* (2017.01); *G06T 2207/20084* (2013.01)

(58) Field of Classification Search

CPC .................. G06F 3/04817; G06T 7/13; G06T 2207/20084; G06T 7/70; G06T 7/11; G06V 10/25; G06V 10/44; G06V 30/414

See application file for complete search history.

(56) References Cited

U.S. PATENT DOCUMENTS

2022/0198187 A1* 6/2022 Zagaynov ............. G06V 10/25

OTHER PUBLICATIONS

CN-116720502-A Machine English Translation (Year: 2023).*

(Continued)

*Primary Examiner* — Vu Le
*Assistant Examiner* — Jessica Yifang Lin
(74) *Attorney, Agent, or Firm* — Joseph M. Butscher; Carroll, Hoette & Butscher, LLC

(57) ABSTRACT

A system and a method are described for extracting a target area of an aviation document. The system and method include inputting the aviation document to an image segmentation model. The aviation document includes a target area of interest that is shown to scale. The image segmentation model generates a first output that provides a predicted location of the target AOI relative to the aviation document. The aviation document is input to an edge/contour detection algorithm that generates a second output which identifies a plurality of candidate polygons based on content in the aviation document. The first output is analyzed with the second output to determine a selected polygon of the candidate polygons in the second output that corresponds with the predicted location of the target AOI in the first output. Pixel coordinate values of the selected polygon in the aviation document are determined.

20 Claims, 6 Drawing Sheets

(56) References Cited

OTHER PUBLICATIONS

RU-2811357-C2 Machine English translation (Year: 2024).*
Extended European Search Report mailed Apr. 22, 2025 for EP 25157323.4 (13 pages).
Jiang Zhongze et al: "Semantic segmentation network combined with edge detection for building extraction in remote sensing images", SPIE Proceedings; [Proceedings of SPIE ISSN 0277-786X], SPIE, US, vol. 11430, Feb. 14, 2020 (Feb. 14, 2020), pp. 114300D-114300D, XP060128032, DOI: 10.1117/12.2538019 ISBN: 978-1-5106-3673-6.
Marchiafava Anthony M: "Machine Learning for Terminal Procedure Chart Change Detection Machine Learning for Terminal Procedure Chart Change Detection", May 31, 2021 (May 31, 2021), XP093268024, Retrieved from the Internet: URL:https://core.ac.uk/download/pdf/475616513.pdf.
El Merabet Youssef et al: "Building Roof Segmentation from Aerial Images Using a Lineand Region-Based Watershed Segmentation Technique", Sensors, vol. 15, No. 2, Feb. 2, 2015 (Feb. 2, 2015), pp. 3172-3203, XP093268536, CH ISSN: 1424-8220, DOI: 10.3390/s150203172.
He Dafang et al: "Multi-Scale Multi-Task FCN for Semantic Page Segmentation and Table Detection", 2017 14th IAPR International Conference On Document Analysis and Recognition (ICDAR), IEEE, vol. 1, Nov. 9, 2017 (Nov. 9, 2017), pp. 254-261, XP033307772, DOI: 10.1109/ICDAR.2017.50 [retrieved on Jan. 25, 2018].

* cited by examiner

AVIATION DOCUMENT TARGET AREA EXTRACTION SYSTEM AND METHOD

FIELD OF THE DISCLOSURE

Examples of the present disclosure generally relate to systems and methods for automatically locating target areas of interest in aviation documents.

BACKGROUND OF THE DISCLOSURE

In the aviation industry, pilots often refer to documents to complement visual observation and assist with navigating to target destinations, such as airports and specific runways thereof. The documents include instrument procedure charts, such as approach plates. Approach plates provide relevant guidance information to a pilot on an approach to an airport. The guidance information can include waypoints, altitudes, speeds, course headings, and the like. This information allows the aircraft to safely transition from an enroute airway segment, through a terminal environment in the immediate vicinity of the airport, to a safe landing on the designated runway. The guidance information in the approach plates may be particularly beneficial in reduced visibility conditions.

Some of the aviation documents include areas that are shown to scale. Areas that are shown to scale depict elements and distances that reflect scaled-down versions of real-life objects and distances. For example, the sizes of the elements in the areas shown to scale and the distances between the elements may be commonly reduced by a particular percentage relative to the sizes of the objects and the distances between the objects in real life. To enhance situational awareness of the pilots, it is helpful to geo-reference the navigational guidance information that is shown to scale with a geographic map of the environment in which the aircraft is navigating. Geo-referencing allows the navigational guidance information from the aviation document to be superimposed with the geographic map. As a result, portions of the geographic map can be used as waypoints to assist the pilot with following the navigational guidance information during an approach to a designated runway. Furthermore, a geo-referenced map can use the latitude and longitude of the aircraft itself to display a current location of the aircraft on the geo-referenced map in relation to the navigational guidance information from the aviation document.

However, identifying "to-scale" areas of approach plates and other aviation documents requires an operator to manually review the aviation documents, mentally determine the to-scale areas, and manually select intersection points (e.g., corners) to define a boundary of each to-scale area. The manual process is labor-intensive, time-consuming, and subjective. For example, human operators inherently introduce inconsistencies in the selection and identification of intersection points that define the to-scale areas, and may result in missing and/or incorrect selections of some intersection points. Furthermore, the manual process is inefficient and impractical for large amounts of aviation documents to process.

SUMMARY OF THE DISCLOSURE

A need exists for a system and a method for automatically locating and highlighting target areas of interest (AOI) on aviation documents, where the target AOI are shown to scale, to improve the accuracy and precision of identifying the target AOI, increase efficiency, and provide quality assurance.

With those needs in mind, certain examples of the present disclosure provide a method for extracting a target area of an aviation document. The method includes inputting an aviation document to an image segmentation model. The aviation document includes a target area of interest that is shown to scale. The image segmentation model is configured to generate a first output that provides a predicted location of the target AOI relative to the aviation document. The method includes inputting the aviation document to an edge/contour detection algorithm. The edge/contour detection algorithm is configured to generate a second output that identifies a plurality of candidate polygons based on content in the aviation document. The method includes analyzing the first output with the second output, via one or more processors, to determine a selected polygon of the candidate polygons in the second output that corresponds with the predicted location of the target AOI in the first output. The method includes determining pixel coordinate values of the selected polygon in the aviation document.

Certain examples of the present disclosure provide a target area extraction system that includes a controller having one or more processors. The controller is configured to input an aviation document to each of an image segmentation model and an edge/contour detection algorithm. The aviation document includes a target area of interest that is shown to scale. The image segmentation model is configured to generate a first output that provides a predicted location of the target AOI relative to the aviation document. The edge/contour detection algorithm is configured to generate a second output that identifies a plurality of candidate polygons based on content in the aviation document. The controller is configured to analyze the first output with the second output and determine a selected polygon of the candidate polygons in the second output that corresponds with the predicted location of the target AOI in the first output. The controller is configured to determine pixel coordinate values of the selected polygon in the aviation document.

DETAILED DESCRIPTION OF THE DISCLOSURE

Figure 1:
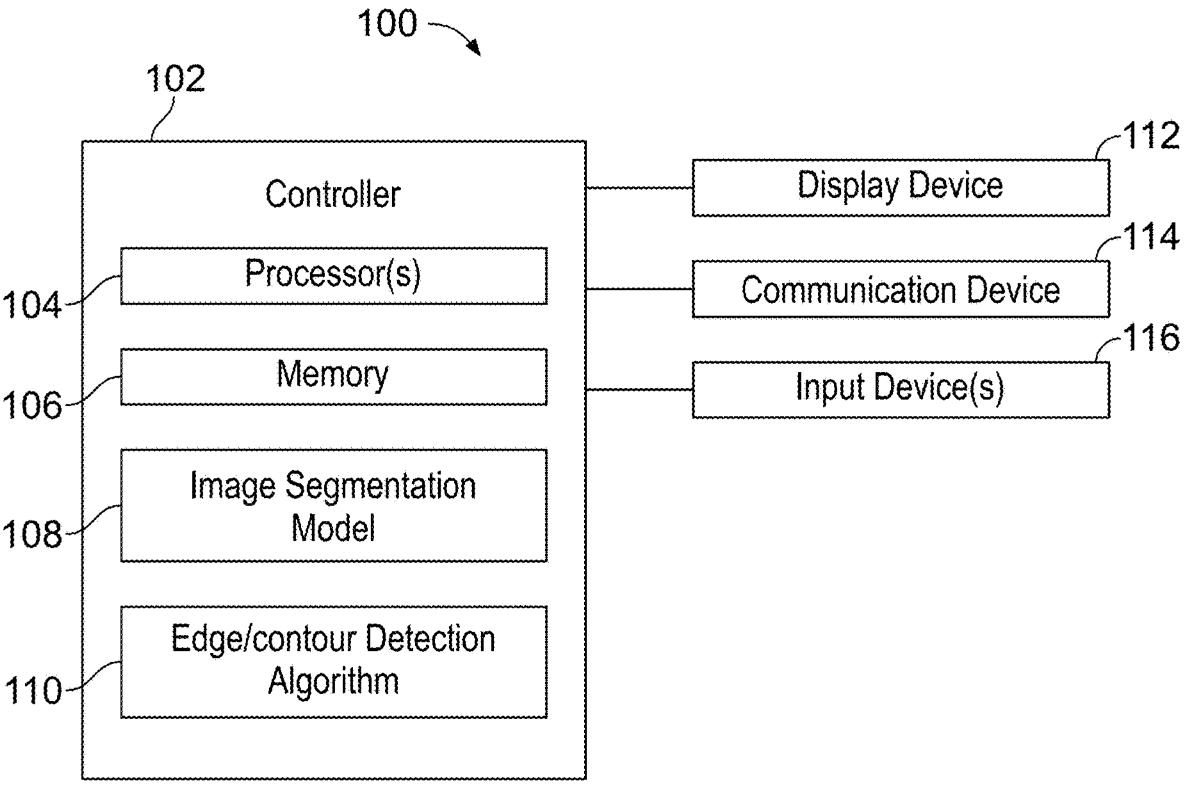
FIG. 1 is a block diagram illustrating a target area extraction system formed in accordance with embodiments herein.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Embodiments of the present disclosure describe a system and method to extract target areas of aviation documents. The target areas may be portions of the aviation documents that are shown to scale, whereas other areas of the aviation documents may not be shown to scale. The areas that are shown to scale may be targeted because the content within these areas of the aviation documents may be geo-referenced with a geographic map to enhance situational awareness of pilots. The content within the at-scale target areas may include navigational guidance information to assist an aircraft during an approach to a runway at an airport. The target areas may be extracted by first determining the bounds of the target areas within the aviation document itself. For example, coordinate values of pixels along a perimeter of the target area are determined. Once the pixel coordinate values are determined, the system and method can segregate the image data that is within the at-scale target area from the other content of the aviation documents outside of the at-scale target area. The image data along the target area may be input to a program that scales the content up or down corresponding to a scale of a geographic map and displays the image data within the geographic map. For example, the image data may include navigational guidance instructions including approach headings, and the navigational guidance instructions may be superimposed within a geographic map that is displayed to a pilot of an aircraft.

The target area extraction system and method may determine the pixel coordinate values of a target area of an aviation document by performing a series of computer-based operations that are not capable of being performed in the mind or by hand by a human operator. For example, the system and method may separately and independently input the same aviation document into an image segmentation model and an edge/contour detection algorithm. The image segmentation model may generate a first output that provides a predicted location of the target area relative to the aviation document. The edge/contour detection algorithm may generate a second output that identifies a plurality of candidate polygons based on content in the aviation document. The candidate polygons may be bounding boxes. The system and method then consolidates the first and second outputs. For example, the system and method may analyze the first output with the second output to compare an extent of congruence (e.g., fit, match, etc.) between the predicted location of the first output and each of the candidate polygons in the second output. The system and method determines a selected or final polygon of the candidate polygons based on this analysis. For example, the system and method determines which of the candidate polygons best corresponds with the predicted location of the target area in the first output. The system and method then determine the pixel coordinate values in the aviation document that define the area of the selected polygon. The determined pixel coordinate values and/or the image data of the aviation document defined by the pixel coordinate values may be stored in a database and/or communicated to a remote device.

This process is more accurate and precise, more objective, and more efficient than a known manual process that involves a user using a mouse or touchpad to click on perceived corners of areas that are shown to scale in digitally-displayed aviation documents. For example, technical effects of the target area extraction system and method described herein include increased efficiency and scalability, as the automated system can scale up to process a high volume of approach plates and/or other aviation documents without additional labor cost. Other technical effects include increased accuracy and precision and objectivity at the identification and delineation of target areas that are shown to scale, relative to the inherently subjective and error-prone human selections.

FIG. 1 is a block diagram illustrating a target area extraction system 100 formed in accordance with embodiments herein. The target area extraction system 100 includes a controller 102 that performs at least some of the operations described herein to automatically determine pixel coordinate values in an aviation document that define a target area of the aviation document shown to scale. The controller 102 represents hardware circuitry that includes and/or is connected with one or more processors 104 (e.g., one or more microprocessors, integrated circuits, microcontrollers, field programmable gate arrays, etc.).

The controller 102 includes and/or is connected with at least one tangible and non-transitory computer-readable storage medium (e.g., memory device) 106. For example, the one or more processors 104 are communicatively connected to the at least one memory device 106. The at least one memory device 106 may store programmed instructions (e.g., software) that are executed by the one or more processors 104 of the controller 102 to perform the operations of the controller 102 described herein. The programmed instructions may instruct the one or more processors 104 how to control the other components of the target area extraction system 100. The programmed instructions may provide one or more algorithms that are performed by the one or more processors 104 as described herein. In an example, the controller 102 includes an image segmentation model 108 and an edge/contour detection algorithm 110. The image segmentation model 108 and the edge/contour detection algorithm 110 are different image processing systems, as described herein. These image processing systems may be stored in the memory device 106 or in another memory device. The one or more processors 104 may access these image processing systems to input aviation documents into the image processing systems. The image processing systems may generate respective outputs that are analyzed by the one or more processors 104 to automatically determine the target AOI on the input aviation documents as described herein. The memory device 106 may store additional information, such as a database that contains aviation documents to analyze, geographic maps, determined pixel coordinate values of the aviation documents that define target areas of interest (AOI) in the aviation documents, image content of the aviation documents representing the target AOI, and/or the like.

The target area extraction system 100 may include additional (e.g., auxiliary) components that are operably connected to the controller 102. For example, the additional components may include a display device 112, a communication device 114, and one or more input devices 116. The additional components may be operably connected to the controller 102 via respective wired or wireless communication pathways. For example, the controller 102 may generate control signals that are communicated along the communication pathways to the additional components to control operation of the additional components. The controller 102 may receive information (e.g., data) from the additional components via the communication pathways. The target area extraction system 100 shown in FIG. 1 is merely exemplary, and non-limiting. For example, the system 100 may include at least one additional component that is not shown in FIG. 1 and/or may lack one or more of the auxiliary components shown in FIG. 1, such as the communication device 114.

The display device 112 may be an electronic monitor, television, touch screen, and/or the like. The controller 102 may control the display device 112 to display information to an operator viewing a display screen of the display device 112. For example, the controller 102 may display the image data within the target AOI of an aviation document on the display device 112. In an example, the controller 102 may display the image data of the target AOI with a geographic map, where the image data is shown at the same scale as the content of the geographic map.

The communication device 114 represents hardware circuitry that can communicate electrical signals via wireless communication pathways and/or wired conductive pathways. The communication device 114 may include transceiving circuitry (e.g., a transceiver or separate transmitter and receiver), one or more antennas, and the like, for wireless communication. The controller 102 may use the communication device 114 to communicate the image data within the target AOI of each aviation document analyzed and/or the pixel coordinate values defining the target AOI to a remote device.

The one or more input devices 116 may permit a human operator to interact with the target area extraction system 100. A human operator may use an input device 116 to submit a user input command that provides instruction to the controller 102 about a desired task, such as where to send the image data of the target AOI that is determined by the controller 102 according to the process described herein. The user input command may be generated by the user input device 116 in response to the operator manipulating the user input device 116, such as by typing a message, pressing designated buttons, providing a voice command, and/or the like. The user input device 116 may convey the information that is input by the operator to the controller 102. The one or more input devices 116 may include physical buttons, a keyboard, virtual buttons on a touchscreen, a graphical user interface (GUI), a mouse, a microphone, or the like. In an example, the display device 112 and the input device 116 may be integrated as a touchscreen interface.

The components of the target area extraction system 100 may be integrated into a computer device and therefore at a common location. The computer device may be a laptop computer, a tablet computer, a smartphone, a workstation, or the like. In another example, at least some of the components of the target area extraction system 100 may be located remote from each other and communicatively connected to each other (e.g., via a network connection). For example, one or more components of the controller 102 (e.g., the memory device 106, the image segmentation model 108, or the edge/contour detection algorithm 110) may be located in a server or other remote device that is discrete from the computer device that contains the other components of the system 100.

Figure 2:
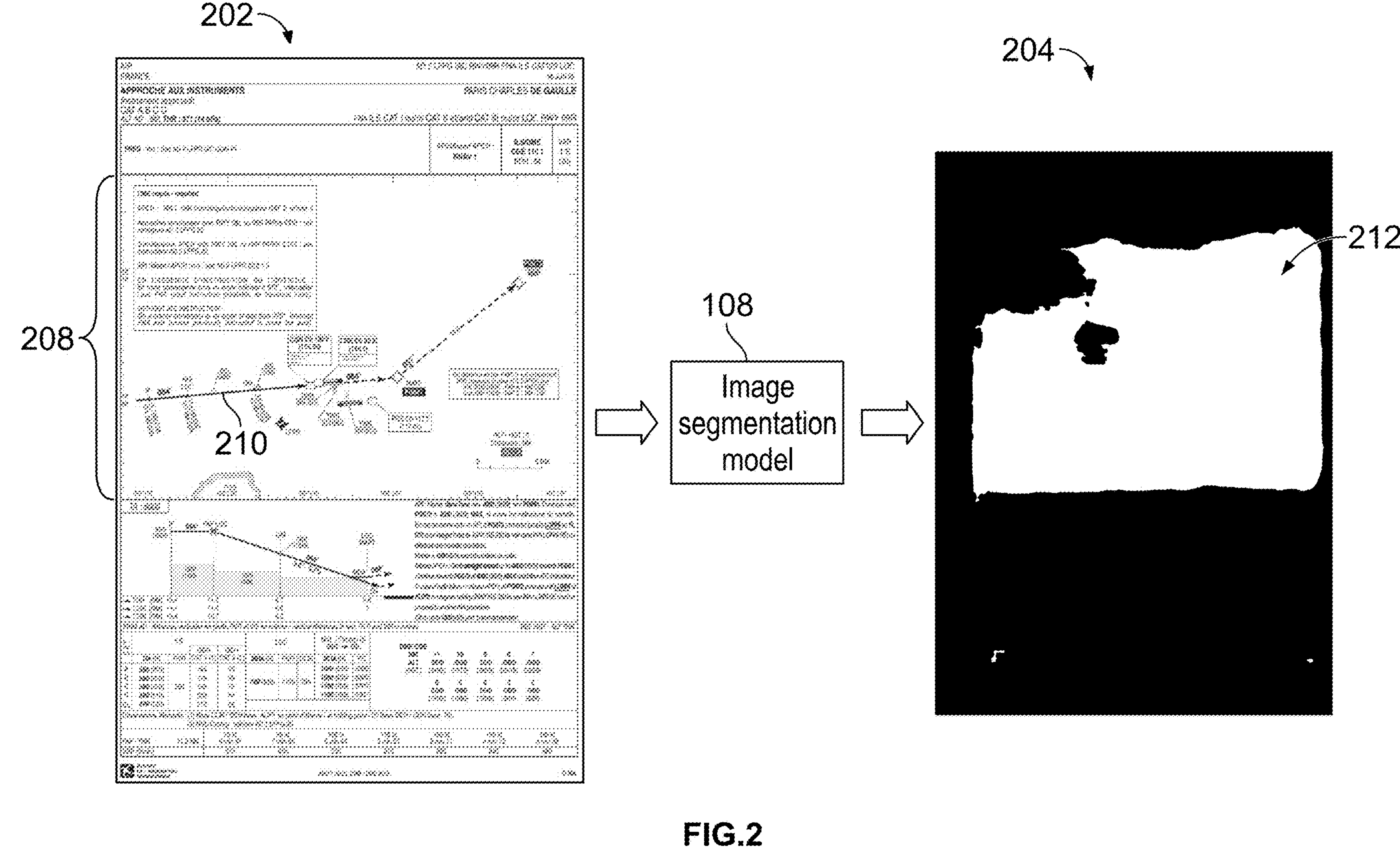
FIG. 2 is a diagram that shows an aviation document input to an image segmentation model of the target area extraction system according to an embodiment.

FIG. 2 is a diagram that shows an aviation document 202 input to the image segmentation model 108 of the target area extraction system 100 according to an embodiment. The diagram also shows that the image segmentation model 108 generates a first output 204 based on the aviation document 202 that is received as an input. The aviation document 202 includes information relevant to a pilot or navigator of an aircraft. The information may provide guidance for controlling movement of the aircraft in flight to position the aircraft for landing at a designated runway of an airport. The aviation document 202 may be an instrument procedure chart. For example, the instrument procedure chart may be an approach plate. The approach plate includes navigational guidance information specific to a particular approach path. Different approach plates may be directed to different approach paths associated with landing at the same airport and/or runway. The navigational guidance information can include course headings, distances, altitudes, waypoints, and/or the like. The pilot is encouraged to implement the navigational guidance instructions to safely and efficiently land the aircraft on the designated runway, even in reduced visibility and no visibility conditions.

The aviation document 202 includes a target AOI 208 that is shown to scale. The content within the target AOI 208 may include navigational guidance information, such as an approach path 210 for the aircraft to follow as the aircraft approaches the designated airport. The navigational guidance information may include elements such as waypoints, environment features, and/or the like. The distances between the elements in the target AOI 208 are shown to scale, so that each of the elements and the spaces between the elements is in the same proportion relative to real world sizes and distances. The navigational guidance information within the target AOI 208 optionally may include a photograph. For example, the navigational guidance information may include a photograph that depicts the runway of the aircraft. In an example, the photograph may be generated (e.g., captured or acquired) by a satellite imaging device, a drone, or the like.

The target area extraction system 100 automatically identifies the target AOI 208 in the aviation document 202 without operator intervention. The target AOI 208 is identified in order to use the image data within the target AOI 208 for providing enhanced situational awareness to a pilot. For example, because it is shown to scale, the image data within the target AOI 208 may be geo-referenced with a geographic map and/or positional coordinates of the aircraft. This geo-referencing allows the navigational guidance information within the target AOI 208 to be displayed at a common scale as the geographic map and superimposed with the geographic map. For example, the approach path 210 may be shown overlaid on the geographic map. Furthermore, the geo-referencing allows an icon representing the aircraft to be displayed relative to the navigational guidance information to indicate a current location of the aircraft relative to the approach path 210 and other navigational guidance information.

In an example, the target AOI 208 that is shown to scale represents only a portion of the aviation document 202, and one or more other portions of the aviation document 202 are not shown to scale. For example, other sections of the approach plate outside of the target AOI 208 may not be shown to scale. These other sections may include information that identifies the approach plate, describes instrument parameters, weather conditions, provides instructions, and/or the like.

Although the aviation document 202 shown in FIG. 2 is an approach plate, the target area extraction system 100 may operate with other types of aviation documents 202 as well. For example, the aviation document 202 may be another type of instrument procedure chart, such as a visual flight rules (VFR) chart.

The aviation document 202 is provided as an input to the image segmentation model 108. The image segmentation model 108 may be an artificial neural network. The image segmentation model 108 may be trained based on analyzing a series of training images to detect a target AOI in an input image. For example, the image segmentation model 108 may be trained to detect, as the target AOI, a portion of an input image that is shown to scale. The portion of the input image shown to scale may include an approach path, a map, and/or other flight information. In an example, the image segmentation model 108 may be a trained neural network that has a U-net architecture.

The first output 204 generated by the image segmentation model 108 provides a predicted location 212 of the target AOI relative to the aviation document 202. The first output 204 may be a binary classification. For example, pixels that are predicted to be within the target AOI are shown as white, and pixels that are predicted to be outside of the target AOI as shown as black. The white portion of the first output 204 indicates where the image segmentation model 108 predicts that the target AOI 208 of the aviation document 202 is located. For example, the white portion indicates the area that the image segmentation model 108 predicts is shown to scale in the aviation document 202, meaning the portion that can be geo-referenced with additional information shown to scale.

Figure 3:
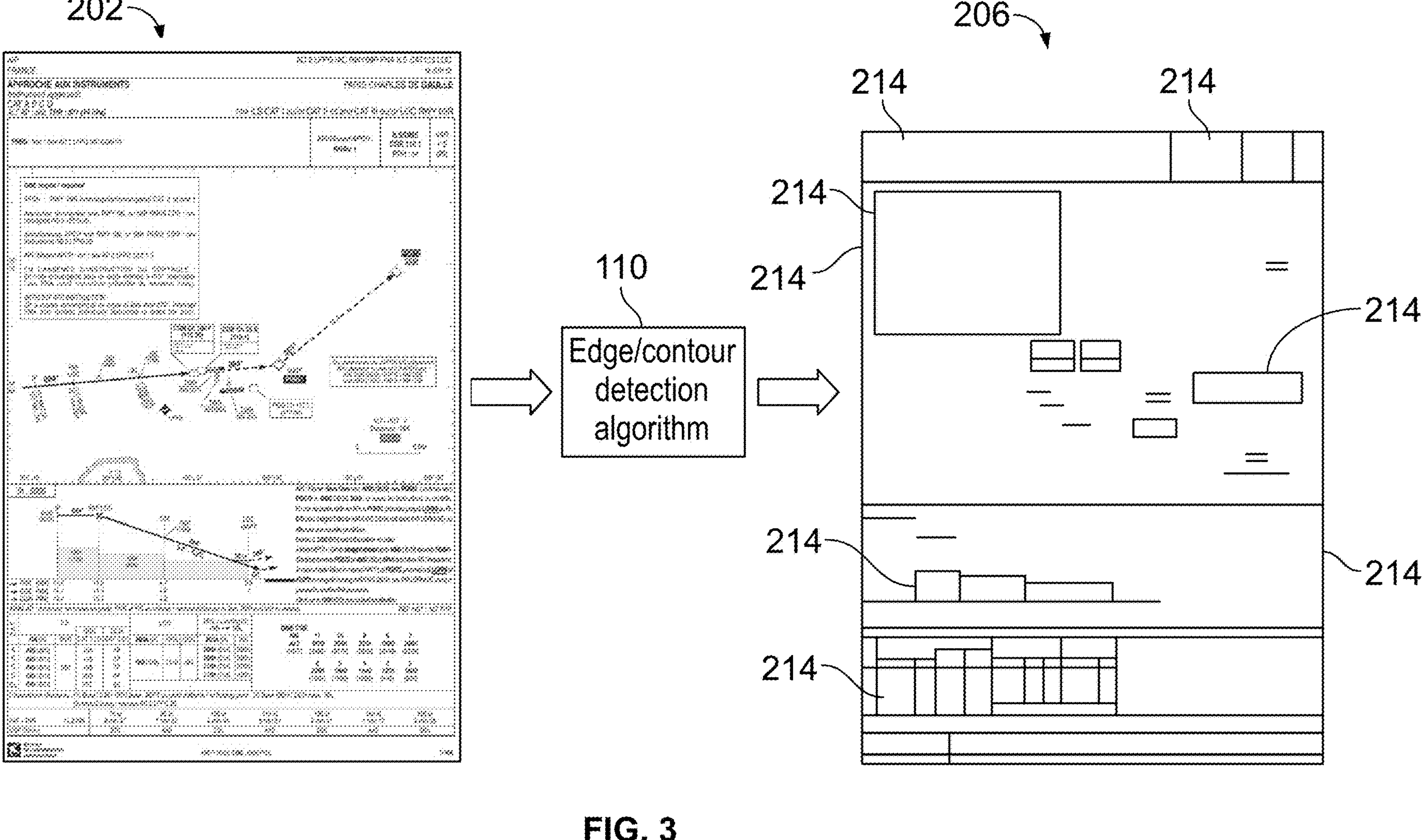
FIG. 3 is a diagram that shows the aviation document input to an edge/contour detection algorithm of the target area extraction system according to an embodiment.

FIG. 3 is a diagram that shows the aviation document 202 input to the edge/contour detection algorithm 110 of the target area extraction system 100 according to an embodiment. The diagram also shows that the edge/contour detection algorithm 110 generates a second output 206 based on the aviation document 202 that is received as an input. FIGS. 2 and 3 show that the same aviation document 202 is separately input to each of the different image processing systems. The second output 206 generated by the edge/contour detection algorithm 110 may identify a plurality of candidate polygons 214 based on content in the aviation document 202. Only some of the candidate polygons 214 are labeled in FIG. 3. In the illustrated embodiment, the candidate polygons 214 are quadrilaterals (referred to herein as boxes). At least some of the candidate polygons 214 may have other shapes in other embodiments, such as triangles, pentagons, hexagons, ellipses, ovals, and/or the like.

The edge/contour detection algorithm 110 may perform an edge detection technique and/or a contour detection technique on the image data of the aviation document 202 to detect all possible box shapes that are shown on the aviation document 202. In an embodiment, the edge/contour detection algorithm 110 is a different type of image processing system than the image segmentation model 108. For example, the edge/contour detection algorithm 110 may analyze characteristics of the pixels in the image data to detect edges, corners, straight lines, and/or the like that are depicted on the aviation document 202. For example, the edge/contour detection algorithm 110 may compare the characteristics (e.g., color, intensity, etc.) of adjacent pixels to one another. As shown in FIG. 3, the second output 206 consists entirely of box-shaped candidate polygons 214 and a few random horizontal lines. In an example, the edge/contour detection algorithm 110 may not use machine learning, and may not be an artificial neural network. In an alternative embodiment, however, the edge/contour detection algorithm 110 may be a machine learning model.

Figure 4:
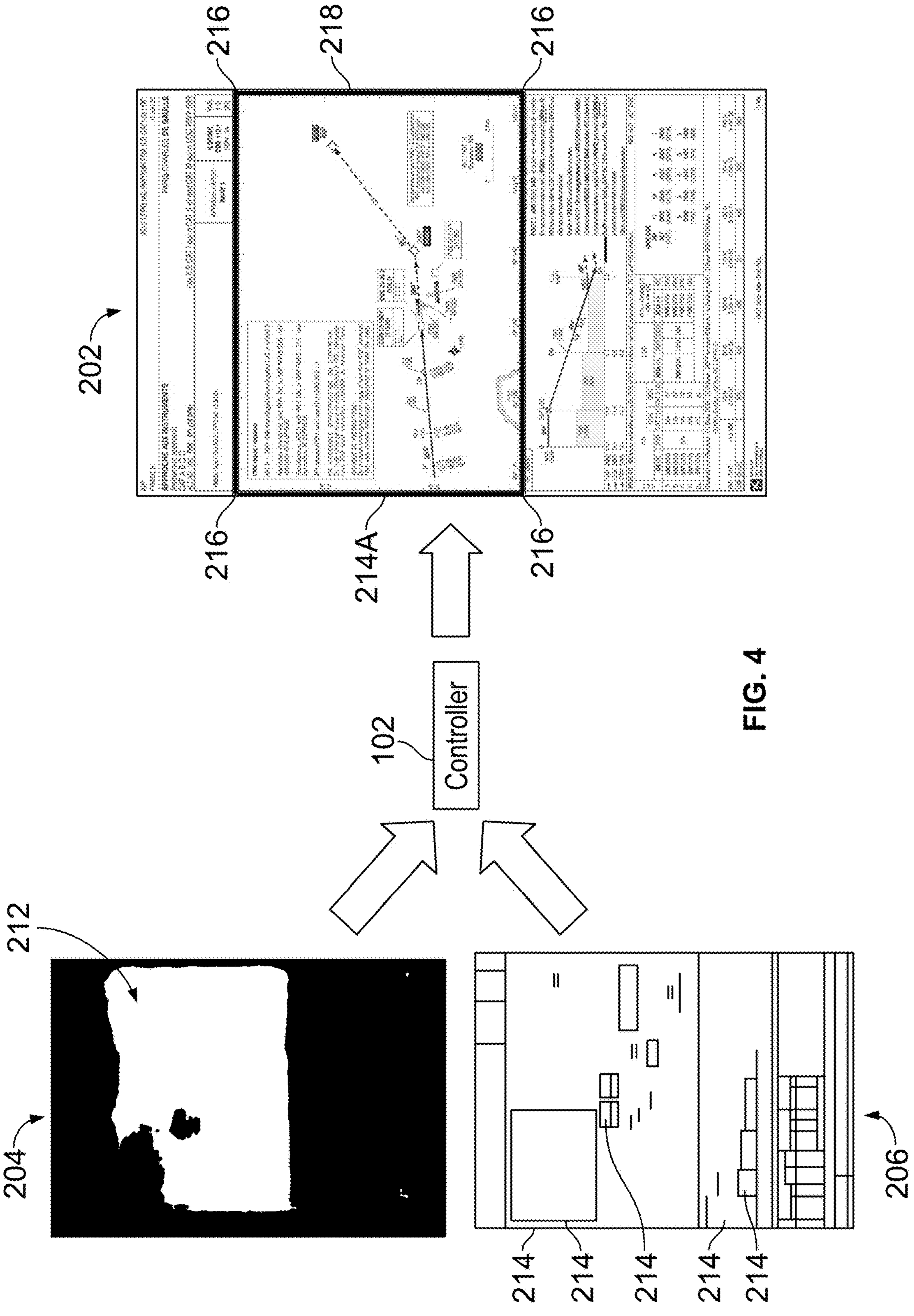
FIG. 4 is a diagram that shows a first output from the image segmentation model and a second output from the edge/contour detection algorithm being input to a controller of the target area extraction system for analysis.

FIG. 4 is a diagram that shows the first output 204 from the image segmentation model 108 and the second output 206 from the edge/contour detection algorithm 110 being input to the controller 102 for analysis. The diagram in FIG. 4 also shows that the controller 102 (e.g., the one or more processors 104 thereof) identifies the target AOI on the aviation document 202 based on the analysis of the first and second outputs 204, 206. The controller 102 consolidates the outputs 204, 206 to identify the candidate polygon 214 of the second output 206 that corresponds with the predicted location 212 of the target AOI in the first output 204. The candidate polygon 214 that is identified is referred to herein as the selected polygon 214A of the candidate polygons 214.

The selected polygon 214A may be determined by comparing the sizes, positions, and orientations of the candidate polygons 214 to the size, position, and orientation of the predicted location 212 in the first output 204. The selected polygon 214A may be the candidate polygon 214 that most closely fits (e.g., matches, aligns, etc.) with the predicted location 212 in the first output 204, relative to the other candidate polygons 214. For example, the controller 102 may determine the selected polygon 214A based on a level of positional overlap between the predicted location 212 of the target AOI in the first output 204 and the candidate polygons 214 in the second output 206. That is, if the first and second outputs 204, 206 were aligned on top of each other, the selected polygon 214A is determined by the controller 102 to have the greatest amount of overlap with the predicted location 212, and vice-versa. In an example, the controller 102 may analyze the first output 204 with the second output 206 by calculating an intersection over union value for each of the candidate polygons 214 relative to the predicted location 212. The controller 102 may select the selected polygon 214A as the candidate polygon 214 that has the greatest intersection over union value out of the candidate polygons 214 tested. Intersection over union is an evaluation metric that is calculated by the controller 102. The intersection of union is generally calculated as the area of overlap between the two areas (e.g., a first candidate polygon 214 and the predicted location 212) divided by the area between the two areas. The intersection of union value may be a unitless value, such as a percentage.

After determining the selected polygon 214A, the controller 102 may output coordinates of the selected polygon 214A within the aviation document 202. For example, based on the location of the selected polygon 214A, the controller 102 may determine pixel coordinate values of at least three points of the selected polygon 214A which are used to define the bounds of the selected polygon 214A. The pixel coordinate values also define the bounds of the target AOI as automatically identified by the system 100. For example, the controller 102 may determine the pixel coordinate values of three or all four of the corners 216 of the selected polygon 214A. The pixel coordinate values may be positional coordinates defined within a coordinate system of the aviation document 202. For example, each point/pixel in the aviation document 202 may have a unique pixel coordinate value in the coordinate system of the aviation document 202.

FIG. 4 shows that the controller 102 outputs the aviation document 202 with the selected polygon 214A indicated by a highlighted bounding box 218. Optionally, the controller 102 may display the aviation document 202 with the highlighted bounding box 218 on the display device 112 to notify and/or seek verification from an operator viewing the display device 112. After determining the pixel coordinate values that define the bounds of the selected polygon 214A (e.g., the target AOI), the controller 102 may store the pixel coordinate values in a database and/or communicate the pixel coordinate values to a remote device via the communication device 114. Optionally, the controller 102 may store and/or communicate the image data of the aviation document 202 that is within the selected polygon 214A (and defined by the pixel coordinate values). For example, the controller 102 may use the pixel coordinate values to segregate the image data that is within the selected polygon 214A from the image data of the aviation document 202 outside of the selected polygon 214A. The controller 102 may filter the image data by extracting only the image data that is within the selected polygon 214A.

In an example, the content of the aviation document 202 within the selected polygon 214A (e.g., the target AOI) is content that is shown to scale and may be geo-referenced with additional content. For example, the controller 102 may extract the image data of the aviation document 202 that represents the target AOI based on the pixel coordinate values. The controller 102 may use that image data (e.g., content) that is extracted from the aviation document 202 to generate an enhanced map. For example, the controller 102 may geo-reference the extracted image data with a geographic map to define the enhanced map. The content from the aviation document 202 and the content on the geographic map may be shown at the same scale on the enhanced map. The controller 102 may display the enhanced map on the display device 112.

Figure 5:
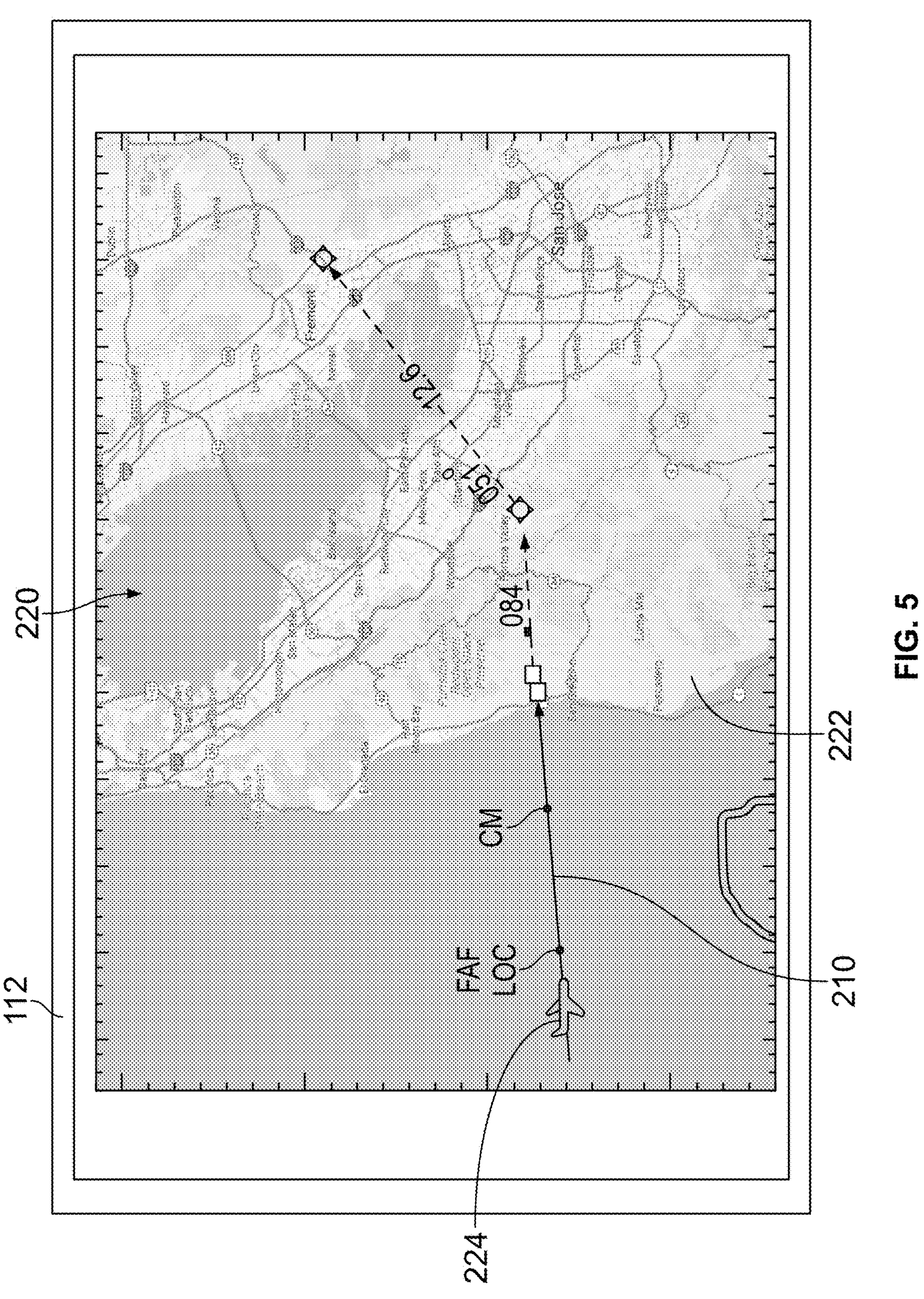
FIG. 5 illustrates a display device of the target area extraction system displaying an enhanced map according to an embodiment.

FIG. 5 illustrates the display device 112 of the target area extraction system 100 displaying an enhanced map 220 according to an embodiment. The enhanced map 220 may show the approach path 210 of the aviation document 202 superimposed on a geographic map 222. The geographic map 222 may show natural features in the environment, such as bodies of water and land (e.g., terrain). Optionally, the geographic map 222 may also show non-natural features, such as airports, city names, jurisdictional borders, and/or the like. The enhanced map 220 may provide enhanced situational awareness for a pilot navigating an aircraft by overlaying the navigational guidance information with the geographic map 222.

In an example, the controller 102 may generate an icon 224 for display on the enhanced map 220. The icon 224 represents an actual aircraft. The aircraft may be in flight. The controller 102 may position the icon 224 on the enhanced map 220 based on a current location of the aircraft relative to earth. For example, the controller 102 may receive positional coordinates of the aircraft over time. The positional coordinates may be GPS coordinates, such as longitude and latitude values. Because the enhanced map is shown to scale, the controller 102 may use the positional coordinates of the aircraft to determine the corresponding location of the aircraft relative to the enhanced map 220 and may position the icon 224 at that location. The display device 112 may display the enhanced map 220 with the aircraft icon 224. The controller 102 may periodically update the position of the icon 224 on the enhanced map 220 to reflect movement of the aircraft relative to the geographic environment.

Figure 6:
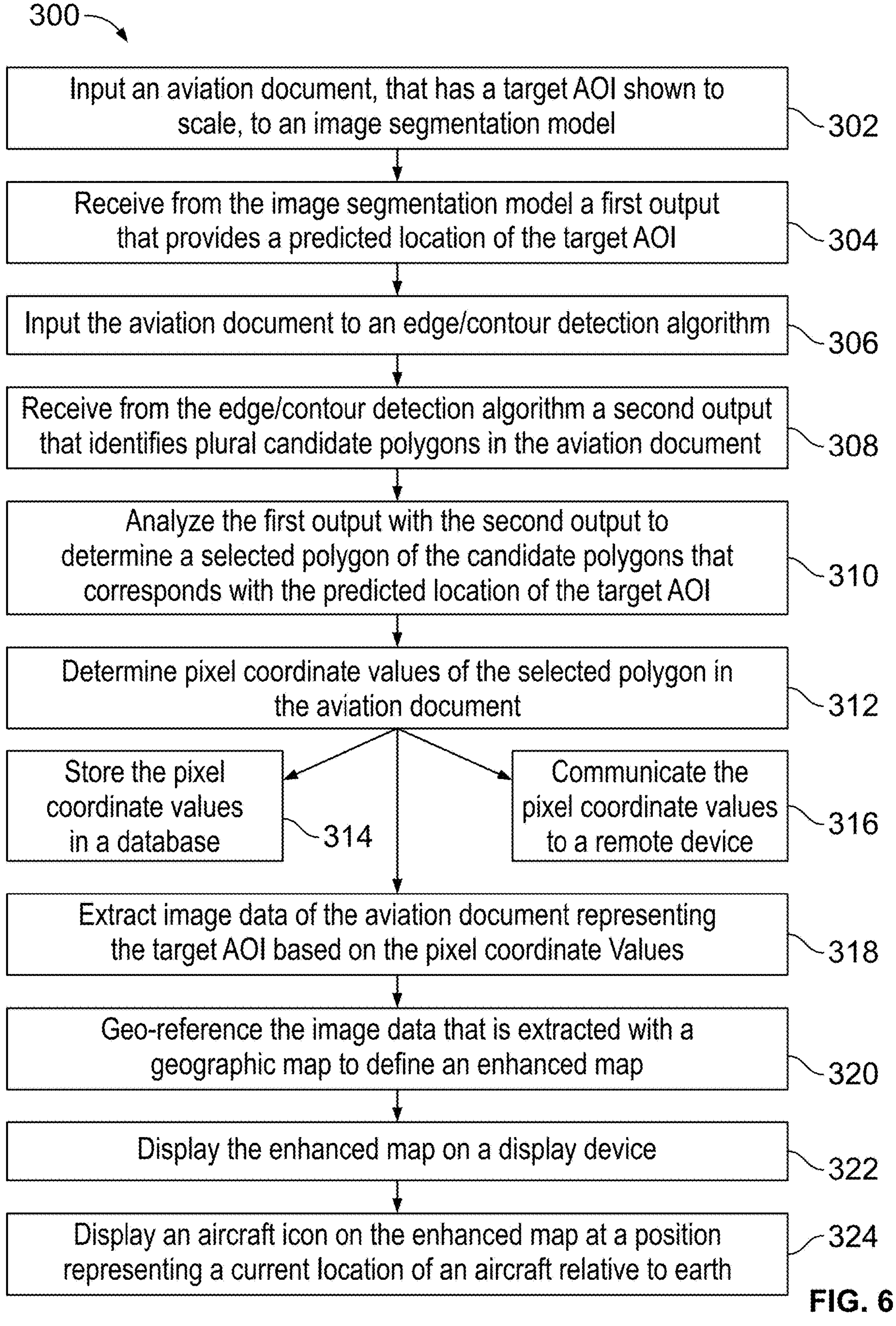
FIG. 6 is a flow chart of a method for extracting a target area of an aviation document according to an example of the present disclosure.

FIG. 6 is a flow chart 300 of a method for extracting a target area of an aviation document according to an example of the present disclosure. The method may be performed, in whole or in part, by the controller 102 of the target area extraction system 100. Optionally, the method may include additional steps than shown in FIG. 6, fewer steps than shown in FIG. 6, and/or different steps than the steps shown in FIG. 6.

At step 302, an aviation document 202 is input to an image segmentation model 108. The aviation document 202 has a target AOI 280 that is shown to scale. At step 304, a first output 204 is received from the image segmentation model 108 based on the aviation document 202. The first output 204 provides a predicted location 212 of the target AOI.

At step 306, the aviation document 202 is input to an edge/contour detection algorithm 110. At step 308, a second output 206 is received from the edge/contour detection algorithm 110 based on the aviation document 202. The second output 206 identifies plural candidate polygons 214 in the aviation document 202.

At step 310, the first output 204 is analyzed with the second output 206 to determine a selected polygon 214A of the candidate polygons 214. The selected polygon 214A corresponds with the predicted location 212 of the target AOI. At step 312, pixel coordinate values of the selected polygon 214A are determined based on the location of the selected polygon 214A in the aviation document 202. The method may take one or more of the following steps shown as steps 314, 316, and 318. For example, the method may take each of the steps 314, 316, and 318 or only one or two of these steps.

At step 314, the pixel coordinate values of the selected polygon 214A are stored in a database. At step 316, the pixel coordinate values of the selected polygon 214A are communicated to a remote device by a communication device 114. At step 318, the image data of the aviation document 202 that represents the target AOI 208 is extracted based on the pixel coordinate values of the selected polygon 214A. Optionally, this image data that is extracted may be stored in the database and/or communicated to the remote device. At step 320, the image data that is extracted is geo-referenced with a geographic map 222 to define an enhanced map 220. At step 322, the enhanced map 220 is displayed on a display device 112. At step 324, an aircraft icon 224 is displayed on the enhanced map 220 at a position that represents a current location of an aircraft relative to earth.

In at least one example, all or part of the systems and methods described herein may be or otherwise include an artificial intelligence (AI) or machine-learning system that can automatically perform the operations of the methods also described herein. For example, the image segmentation model 108 can be an artificial intelligence or machine learning system. Optionally, the edge/contour detection algorithm 110 and/or other portions of the controller 102 may be artificial intelligence or machine learning systems. These types of systems may be trained from outside information and/or self-trained to repeatedly improve the accuracy with how data is analyzed. Over time, these systems can improve by determining such information with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of locations of actual intersections. The training minimizes conflicts and interference by performing an iterative training algorithm, in which the systems are retrained with an updated set of data and based on the feedback examined prior to the most recent training of the systems. This provides a robust analysis model that can better identify targeted information in a cost effective and efficient manner.

Further, the disclosure comprises examples according to the following clauses:

Clause 1. A method comprising:

inputting an aviation document to an image segmentation model, the aviation document including a target area of interest that is shown to scale, the image segmentation model configured to generate a first output that provides a predicted location of the target AOI relative to the aviation document;

inputting the aviation document to an edge/contour detection algorithm, the edge/contour detection algorithm configured to generate a second output that identifies a plurality of candidate polygons based on content in the aviation document;

analyzing the first output with the second output, via one or more processors, to determine a selected polygon of the candidate polygons in the second output that corresponds with the predicted location of the target AOI in the first output; and determining pixel coordinate values of the selected polygon in the aviation document.

Clause 2. The method of Clause 1, wherein the image segmentation model is a trained neural network that has a U-net architecture, and the first output is a binary classification.

Clause 3. The method of Clause 1 or Clause 2, wherein the edge/contour detection algorithm analyzes characteristics of pixels of the aviation document to identify the candidate polygons.

Clause 4. The method of any of Clauses 1-3, wherein the edge/contour detection algorithm performs at least one of edge detection or contour detection on image data within the aviation document to identify the candidate polygons.

Clause 5. The method of any of Clauses 1-4, wherein the selected polygon is determined based on a level of positional overlap between the predicted location of the target AOI in the first output and the candidate polygons in the second output.

Clause 6. The method of any of Clauses 1-5, wherein the first output is analyzed with the second output by calculating an intersection over union value for each of the candidate polygons relative to the predicted location of the target AOI, and the selected polygon is determined as the candidate polygon that has the greatest intersection over union value.

Clause 7. The method of any of Clauses 1-6, wherein the aviation document is an approach plate, and the target AOI depicts navigational guidance information for an aircraft to approach an airport.

Clause 8. The method of any of Clauses 1-7, wherein the candidate polygons are quadrilateral polygons.

Clause 9. The method of any of Clauses 1-8, further comprising at least one of: (i) storing the pixel coordinate values of the selected polygon in a database, or (ii) communicating the pixel coordinate values of the selected polygon to a remote device via a communication device.

Clause 10. The method of any of Clauses 1-9, further comprising:

extracting image data of the aviation document representing the target AOI based on the pixel coordinate values that are determined;

geo-referencing the image data that is extracted with a geographic map to define an enhanced map; and displaying the enhanced map on a display device.

Clause 11. The method of Clause 10, further comprising displaying an icon on the enhanced map that is displayed on the display device, the icon representing an aircraft, a position of the icon on the enhanced map representing a current location of the aircraft relative to earth.

Clause 12. A target area extraction system comprising:

a controller including one or more processors, the controller configured to input an aviation document to each of an image segmentation model and an edge/contour detection algorithm, the aviation document including a target area of interest that is shown to scale, wherein the image segmentation model is configured to generate a first output that provides a predicted location of the target AOI relative to the aviation document, wherein the edge/contour detection algorithm is configured to generate a second output that identifies a plurality of candidate polygons based on content in the aviation document, the controller configured to analyze the first output with the second output and determine a selected polygon of the candidate polygons in the second output that corresponds with the predicted location of the target AOI in the first output, the controller configured to determine pixel coordinate values of the selected polygon in the aviation document.

Clause 13. The target area extraction system of Clause 12, further comprising a display device communicatively connected to the controller, wherein the controller is configured to extract image data of the aviation document representing the target AOI based on the pixel coordinate values that are determined and geo-reference the image data that is extracted with a geographic map to define an enhanced map, the controller further configured to display the enhanced map on the display device.

Clause 14. The target area extraction system of Clause 13, wherein the controller is configured to generate an icon for display on the enhanced map by the display device, the icon representing an aircraft, the controller configured to position the icon on the enhanced map based on a current location of the aircraft relative to earth.

Clause 15. The target area extraction system of any of Clauses 12-14, wherein the image segmentation model is a trained neural network that has a U-net architecture, and the first output is a binary classification.

Clause 16. The target area extraction system of any of Clauses 12-15, wherein the edge/contour detection algorithm is configured to analyze characteristics of pixels of the aviation document to identify the candidate polygons.

Clause 17. The target area extraction system of any of Clauses 12-16, wherein the edge/contour detection algorithm is configured to perform at least one of edge detection or contour detection on image data within the aviation document to identify the candidate polygons.

Clause 18. The target area extraction system of any of Clauses 12-17, wherein the controller is configured to determine the selected polygon based on a level of positional overlap between the predicted location of the target AOI in the first output and the candidate polygons in the second output.

Clause 19. The target area extraction system of any of Clauses 12-18, wherein the controller is configured to analyze the first output with the second output by calculating an intersection over union value for each of the candidate polygons relative to the predicted location of the target AOI, and the controller is configured to determine the selected polygon as the candidate polygon that has the greatest intersection over union value.

Clause 20. The target area extraction system of any of Clauses 12-19, wherein the aviation document is an approach plate, and the target AOI depicts navigational guidance information for an aircraft to approach an airport.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:

inputting an aviation document to an image segmentation model, the aviation document including a target area of interest (AOI) that is shown to scale, the image segmentation model configured to generate a first output that provides a predicted location of the target AOI relative to the aviation document;

inputting the aviation document to an edge/contour detection algorithm, the edge/contour detection algorithm configured to generate a second output that identifies a plurality of candidate polygons based on content in the aviation document;

analyzing the first output with the second output, via one or more processors, to determine a selected polygon of the candidate polygons in the second output that corresponds with the predicted location of the target AOI in the first output;

determining pixel coordinate values of the selected polygon in the aviation document;

extracting image data of the aviation document representing the target AOI based on the pixel coordinate values that are determined;

geo-referencing the image data that is extracted with a geographic map to define an enhanced map; and displaying the enhanced map on a display device.

2. The method of claim 1, wherein the image segmentation model is a trained neural network that has a U-net architecture, and the first output is a binary classification.

3. The method of claim 1, wherein the edge/contour detection algorithm analyzes characteristics of pixels of the aviation document to identify the candidate polygons.

4. The method of claim 1, wherein the edge/contour detection algorithm performs at least one of edge detection or contour detection on image data within the aviation document to identify the candidate polygons.

5. The method of claim 1, wherein the selected polygon is determined based on a level of positional overlap between the predicted location of the target AOI in the first output and the candidate polygons in the second output.

6. The method of claim 1, wherein the first output is analyzed with the second output by calculating an intersection over union value for each of the candidate polygons relative to the predicted location of the target AOI, and the selected polygon is determined as the candidate polygon that has the greatest intersection over union value.

7. The method of claim 1, wherein the aviation document is an approach plate, and the target AOI depicts navigational guidance information for an aircraft to approach an airport.

8. The method of claim 1, wherein the candidate polygons are quadrilateral polygons.

9. The method of claim 1, further comprising at least one of: (i) storing the pixel coordinate values of the selected polygon in a database, or (ii) communicating the pixel coordinate values of the selected polygon to a remote device via a communication device.

10. The method of claim 1, further comprising displaying an icon on the enhanced map that is displayed on the display device, the icon representing an aircraft, a position of the icon on the enhanced map representing a current location of the aircraft relative to earth.

11. A target area extraction system comprising:

a display device; and a controller including one or more processors, the controller communicatively connected to the controller, the controller configured to input an aviation document to each of an image segmentation model and an edge/contour detection algorithm, the aviation document including a target area of interest (AOI) that is shown to scale, wherein the image segmentation model is configured to generate a first output that provides a predicted location of the target AOI relative to the aviation document, wherein the edge/contour detection algorithm is configured to generate a second output that identifies a plurality of candidate polygons based on content in the aviation document, the controller configured to:

analyze the first output with the second output and determine a selected polygon of the candidate polygons in the second output that corresponds with the predicted location of the target AOI in the first output, the controller configured to determine pixel coordinate values of the selected polygon in the aviation document, extract image data of the aviation document representing the target AOI based on the pixel coordinate values that are determined, geo-reference the image data that is extracted with a geographic map to define an enhanced map, and display the enhanced map on the display device.

12. The target area extraction system of claim 11, wherein the controller is configured to generate an icon for display on the enhanced map by the display device, the icon representing an aircraft, the controller configured to position the icon on the enhanced map based on a current location of the aircraft relative to earth.

13. The target area extraction system of claim 11, wherein the image segmentation model is a trained neural network that has a U-net architecture, and the first output is a binary classification.

14. The target area extraction system of claim 11, wherein the edge/contour detection algorithm is configured to analyze characteristics of pixels of the aviation document to identify the candidate polygons.

15. The target area extraction system of claim 11, wherein the edge/contour detection algorithm is configured to perform at least one of edge detection or contour detection on image data within the aviation document to identify the candidate polygons.

16. The target area extraction system of claim 11, wherein the controller is configured to determine the selected polygon based on a level of positional overlap between the predicted location of the target AOI in the first output and the candidate polygons in the second output.

17. The target area extraction system of claim 11, wherein the controller is configured to analyze the first output with the second output by calculating an intersection over union value for each of the candidate polygons relative to the predicted location of the target AOI, and the controller is configured to determine the selected polygon as the candidate polygon that has the greatest intersection over union value.

18. The target area extraction system of claim 11, wherein the aviation document is an approach plate, and the target AOI depicts navigational guidance information for an aircraft to approach an airport.

19. The method of claim 1, wherein the aviation document includes information that provides guidance for controlling movement of an aircraft in flight to position the aircraft for landing at a runway of an airport.

20. The method of claim 1, wherein the aviation document includes one or both of an approach plate or a visual flight rules chart.

* * * * *